United States Patent
Chéné et al.

(10) Patent No.: US 8,090,844 B2
(45) Date of Patent: Jan. 3, 2012

(54) CONTENT MANAGEMENT ACROSS SHARED, MOBILE FILE SYSTEMS

(75) Inventors: Marc Chéné, Ottawa (CA); Julian Craddock, Maderia Park (CA); Paul Haskins, Manotick (CA); Barry Yerxa, Ottawa (CA)

(73) Assignee: TrueContext Corporation, Kanata, Ontario (CA)

( * ) Notice: Subject to any disclaimer, the term of this patent is extended or adjusted under 35 U.S.C. 154(b) by 1259 days.

(21) Appl. No.: 10/961,545

(22) Filed: Oct. 8, 2004

(65) Prior Publication Data

US 2006/0080397 A1 Apr. 13, 2006

(51) Int. Cl.
G06F 15/16 (2006.01)
G06F 15/177 (2006.01)
G06F 15/173 (2006.01)
G06F 3/00 (2006.01)

(52) U.S. Cl. ........ 709/228; 709/221; 709/224; 709/232; 715/740; 715/744; 715/746; 715/747; 715/748

(58) Field of Classification Search .................. 709/213, 709/220–222, 225–229, 203, 218, 224, 232; 715/864, 735, 733, 736, 737, 740–749; 713/153, 713/165, 100; 703/20–23
See application file for complete search history.

(56) References Cited

U.S. PATENT DOCUMENTS

| | | | |
|---|---|---|---|
| 5,054,095 A | 10/1991 | Bernsen et al. | 382/30 |
| 5,513,332 A | 4/1996 | Wimer et al. | |
| 5,664,207 A | 9/1997 | Crumpler et al. | |
| 5,675,743 A | 10/1997 | Mavity | |
| 5,680,548 A | 10/1997 | Trugman | |
| 5,781,732 A * | 7/1998 | Adams | 709/205 |
| 5,801,689 A | 9/1998 | Huntsman | |
| 5,812,857 A | 9/1998 | Nelson et al. | |
| 5,819,274 A | 10/1998 | Jackson, Jr. | |
| 5,884,317 A | 3/1999 | Cline et al. | |
| 5,887,141 A | 3/1999 | Trugman | |
| 5,926,637 A | 7/1999 | Cline et al. | |
| 5,937,198 A | 8/1999 | Nelson et al. | |
| 5,949,412 A | 9/1999 | Huntsman | |
| 5,960,421 A | 9/1999 | Cline et al. | |

(Continued)

FOREIGN PATENT DOCUMENTS

WO WO 97/43717 11/1997

(Continued)

OTHER PUBLICATIONS

Pocket PC magazine, TrueContext mExperience wins Best Knowledge Management Software Award, Nov. 2003, p. 1-2.*

(Continued)

Primary Examiner — Gregory Todd
(74) Attorney, Agent, or Firm — Nixon Peabody LLP (57) ABSTRACT

A content management system and method are disclosed having one or more shared file systems located on one or more networks having a firewall. The content management system includes an explorer client, a mounting client, and a gateway. The gateway is in communication with both the explorer client and the mounting client. The explorer client forms a profile of a user device by determining the characteristics of the user device. The mounting client determines the capabilities of the one or more file systems and where content resides on each of the one or more file systems. The gateway then creates a virtual abstraction layer based on the profile of the user device and the capabilities of the one or more file systems.

38 Claims, 6 Drawing Sheets

U.S. PATENT DOCUMENTS

| | | | |
|---|---|---|---|
| 6,006,229 A | 12/1999 | Schmidt et al. | |
| 6,006,277 A | 12/1999 | Talati et al. | |
| 6,070,199 A | 5/2000 | Axtman et al. | |
| 6,115,744 A | 9/2000 | Robins et al. | |
| 6,119,167 A | 9/2000 | Boyle et al. | |
| 6,128,742 A | 10/2000 | Felt | |
| 6,216,151 B1 | 4/2001 | Antoun | |
| 6,230,190 B1 | 5/2001 | Edmonds et al. | |
| 6,233,608 B1 | 5/2001 | Laursen et al. | |
| 6,236,999 B1 | 5/2001 | Jacobs et al. | |
| 6,243,676 B1 | 6/2001 | Witteman | |
| 6,247,048 B1 | 6/2001 | Greer et al. | |
| 6,253,257 B1 | 6/2001 | Dundon | |
| 6,288,718 B1 | 9/2001 | Laursen et al. | |
| 6,289,212 B1 | 9/2001 | Stein et al. | |
| 6,292,657 B1 | 9/2001 | Laursen et al. | |
| 6,292,833 B1 | 9/2001 | Liao et al. | |
| 6,301,471 B1 | 10/2001 | Dahm et al. | |
| 6,301,474 B1 | 10/2001 | Hartmaier et al. | |
| 6,304,746 B1 | 10/2001 | Fascenda et al. | |
| 6,304,753 B1 | 10/2001 | Hartmaier | |
| 6,304,881 B1 | 10/2001 | Halim et al. | |
| 6,314,108 B1 | 11/2001 | Ramasubramani et al. | |
| 6,317,594 B1 | 11/2001 | Gossman et al. | |
| 6,317,831 B1 | 11/2001 | King | |
| 6,330,568 B1 | 12/2001 | Boothby et al. | |
| 6,341,270 B1 | 1/2002 | Esposito et al. | |
| 6,341,316 B1 | 1/2002 | Kloba et al. | |
| 6,347,095 B1 | 2/2002 | Tang et al. | |
| 6,353,839 B1 | 3/2002 | King et al. | |
| 6,356,964 B1 | 3/2002 | Mohindra et al. | |
| 6,360,252 B1 | 3/2002 | Rudy et al. | |
| 6,360,279 B1 | 3/2002 | Woods et al. | |
| 6,363,419 B1 | 3/2002 | Martin, Jr. et al. | |
| 6,370,518 B1 | 4/2002 | Payne et al. | |
| 6,385,643 B1 | 5/2002 | Jacobs et al. | |
| 6,393,269 B1 | 5/2002 | Hartmaier et al. | |
| 6,397,345 B1 | 5/2002 | Edmonds et al. | |
| 6,400,754 B2 | 6/2002 | Fleming et al. | |
| 6,405,037 B1 | 6/2002 | Rossmann | |
| 6,584,493 B1 * | 6/2003 | Butler | 709/204 |
| 6,879,997 B1 * | 4/2005 | Ketola et al. | 709/208 |
| 7,302,274 B2 * | 11/2007 | Makela et al. | 455/509 |
| 7,330,717 B2 * | 2/2008 | Gidron et al. | 455/418 |
| 7,346,841 B2 * | 3/2008 | Kuruoglu et al. | 715/751 |
| 7,356,563 B1 * | 4/2008 | Leichtling et al. | 709/204 |
| 7,461,347 B2 * | 12/2008 | Zhu et al. | 715/751 |
| 7,966,408 B2 * | 6/2011 | Schramm et al. | 709/228 |
| 2001/0041556 A1 | 11/2001 | Laursen et al. | |
| 2001/0051979 A1 | 12/2001 | Aufricht et al. | |
| 2002/0016813 A1 | 2/2002 | Woods et al. | |
| 2002/0023173 A1 | 2/2002 | Jacobs et al. | |
| 2002/0032722 A1 | 3/2002 | Baynes, Jr. et al. | |
| 2002/0032750 A1 | 3/2002 | Kanefsky | |
| 2002/0035605 A1 | 3/2002 | McDowell et al. | |
| 2002/0035699 A1 | 3/2002 | Crosbie | |
| 2002/0039882 A1 | 4/2002 | Ternullo et al. | |
| 2002/0039899 A1 | 4/2002 | Rossman | |
| 2002/0042831 A1 * | 4/2002 | Capone et al. | 709/230 |
| 2002/0046299 A1 | 4/2002 | Lefeber et al. | |
| 2002/0049069 A1 | 4/2002 | Johnson | |
| 2002/0049905 A1 | 4/2002 | Deo et al. | |
| 2002/0052207 A1 | 5/2002 | Hunzinger | |
| 2002/0052674 A1 | 5/2002 | Chang et al. | |
| 2002/0052781 A1 | 5/2002 | Aufricht et al. | |
| 2002/0052916 A1 | 5/2002 | Kloba et al. | |
| 2002/0055917 A1 | 5/2002 | Muraca | |
| 2002/0059256 A1 | 5/2002 | Halim et al. | |
| 2002/0059459 A1 | 5/2002 | Koka et al. | |
| 2002/0069263 A1 | 6/2002 | Sears et al. | |
| 2002/0073163 A1 | 6/2002 | Churchill et al. | 709/214 |
| 2002/0073196 A1 | 6/2002 | Westervelt et al. | |
| 2002/0114341 A1 | 8/2002 | Sutherland et al. | |
| 2002/0131404 A1 * | 9/2002 | Mehta et al. | 370/352 |
| 2002/0169858 A1 * | 11/2002 | Bellinger et al. | 709/220 |
| 2002/0194219 A1 | 12/2002 | Bradley et al. | 715/506 |
| 2003/0032409 A1 | 2/2003 | Hutcheson | |
| 2003/0139174 A1 * | 7/2003 | Rao | 455/418 |
| 2003/0182431 A1 * | 9/2003 | Sturniolo et al. | 709/227 |
| 2003/0220879 A1 | 11/2003 | Gaughan et al. | 705/51 |
| 2004/0003341 A1 | 1/2004 | alSafadi et al. | |
| 2004/0128342 A1 | 7/2004 | Maes et al. | |
| 2004/0158730 A1 * | 8/2004 | Sarkar | 713/200 |
| 2005/0177577 A1 * | 8/2005 | Asokan et al. | 707/100 |
| 2006/0031749 A1 * | 2/2006 | Schramm et al. | 715/500.1 |

FOREIGN PATENT DOCUMENTS

| | | |
|---|---|---|
| WO | WO 01/52496 | 7/2001 |
| WO | WO 01/61517 | 8/2001 |

OTHER PUBLICATIONS

TrueContext, TrueContext mExperience Manager, Aug. 2003, p. 1-4.*

TrueContext, Enabling mobility in the Enterprise, 2002, p. 1-4.*

UMTS: A Middleware Architecture and Mobile API Approach, 7 pages, Birgit Kreller, Anthony Sang-Bum Park, Jens Meggers, Gunnar Forsgren, Erno Kovacs, Michael Rosinus, 1998 IEEE.

International Search Report, Application No. PCT/IB03/03045, dated Nov. 24, 2003, 4 pages.

International Search Report dated May 25, 2005.

International Search Report dated May 26, 2005.

International Search Report and Opinion dated Jun. 2, 2006.

"4[th]pass Delivers Free Java Bytecode Obfuscator to JavaLobby," Java Industry Connection™, java.sun.com, May 6, 1999, 2 pages.

4thpass Dynamic Provisioning, www.4thpass.com/solutions/index.html, Apr. 16, 2002, 16 pages.

Gutzman, Alexis, "The Who, What and Why of WAP," ecommerce-guide.com®, http://ecommerce.internet.com/news/insights/ectech/article/0,,9561_381271,00.html, May 26, 2000, 4 pages.

IEC: Wireless Application Protocol (WAP), International Engineering Consortium, http://www.ieg.org/online/tutorials, copyright 2002, 10 pages.

Java Develper's Journal, http://www.sys-con.com, May 20, 2002, 4 pages.

Symbian Technology, http://www.symbian.com, Mar. 2002, 39 pages.

TrueContext—collaboration for the wireless value chain, http://www.truecontext.com, Feb. 27, 2002, 28 pages.

Zuvix Tehcnology, http://211.174.63.103, May 20, 2002, 2 pages.

International Search Report; dated May 25, 2005.

* cited by examiner

CONTENT MANAGEMENT ACROSS SHARED, MOBILE FILE SYSTEMS

FIELD OF THE INVENTION

The present invention relates generally to content management and, more particularly, to a system and method for managing, routing, and providing content across shared, mobile file systems to users who are intermittently connected across a heterogeneous mix of networks and mobile devices.

BACKGROUND OF THE INVENTION

Today, the majority of digital content resides within computer based file systems. We use the file systems to manage our digital content by organizing it, distributing it, and controlling access in much the same way as filing cabinets manage paper-based content. File systems can be found on personal computers and corporate servers. More recently file systems have been implemented on mobile devices like our cellular telephones, Personal Digital Assistants (PDA), laptop computers, and PC Tablets. In all instances the file systems can be used to support the management of content whether personal or corporate.

Content management across shared, mobile file systems is an increasingly common challenge for organizations today as more and more mobile devices become available (laptops, cell phones, PDAs, tablet PCs, etc.), as more and more content is available in electronic form (documents, email, pictures, commerce, videos, data etc.), and as access to devices and content becomes more and more ubiquitous (internet, wireless, etc.). Current approaches focus either on providing "secure remote access" in the form of Virtual Private Networks, or on providing "content management" in the form of standalone document repositories.

Enterprise IT departments are challenged to provide reliable, cost effective mechanisms that allow enterprise employees, partners, and customers to securely share and manage enterprise file system content from outside of the firewall, or across locations within the enterprise. A well implemented solution will allow the mobile user to set up a secure communication channel to the enterprise file systems, to be authenticated as a valid user, and to be authorized to access specific enterprise resources. Ideally, users will be enabled to share and manage mobile content across distributed intermittently connected file systems in a secure fashion.

SUMMARY OF THE INVENTION

According to one embodiment of the present invention, a method for managing content across shared file systems located on networks having a firewall is disclosed. The method comprises determining the characteristics of a user device when a user of the user device requests content from one or more of the file systems. The characteristics of the user device include the type of device, the amount of RAM and disk space available on the user device, and the operating system utilized by the user device. The method further comprises determining the characteristics of the networks including the current speed, capacity, and type of networks, as well as any firewall properties or restrictions that might affect transmission. The method further comprises determining the characteristics of the file systems that contain the requested content. The method further comprises creating a virtual abstraction layer based on the characteristics of the user device, the networks, and the file systems. The virtual abstraction layer provides the content from the shared file systems to the user device such that the view to the user is the same as if that content was local to the user device.

According to another embodiment of the present invention a method for managing content across an intermittent mobile connection having a firewall is disclosed. The method comprises managing one or more file systems. The method further comprises determining the characteristics of a user device when a user of the user device requests content from any of the managed file systems. The characteristics of the user device includes the type of device, the amount of RAM and disk space available on the user device, and the operating system utilized by the user device. The method further comprises determining the characteristics of the intermittent mobile connection including the current speed, capacity, and type of the connection, as well as any firewall properties or restrictions that might affect transmission. The method further comprises determining the characteristics of any of the managed file systems that contain the requested content, including the characteristics of the content on the file system. The method further comprises generating and maintaining a cached representation of the content of the managed file systems. The cached representation is capable of being transparently interacted with by the user on the user device.

According to another embodiment of the present invention a method for managing content across an intermittent mobile connection having a firewall is disclosed. The method comprises managing one or more file systems. The method further comprises determining the characteristics of a user device when a user of the user device requests content from any of the managed file systems. The characteristics of the user device include the type of device, the amount of RAM and disk space available on the user device, and the operating system utilized by the user device. The method further comprises determining the characteristics of the intermittent mobile connection including the current speed, capacity, and type of the connection, as well as any firewall properties or restrictions that might affect transmission. The method further comprises determining the characteristics of any of the managed file systems that contain the requested content. The characteristics of the file system include an authorization structure and authentication information. The method further comprises generating and maintaining a cached representation of the authorization structure and authentication information. The cached representation is capable of authorizing and authenticating the user on the user device.

According to some embodiments of the present invention, an article of manufacture is disclosed comprising a computer readable medium and a plurality of instructions wherein at least a portion of said plurality of instructions are storable in said computer readable medium. The plurality of instructions are configured to cause a processor to perform the steps of the above described methods.

According to some embodiments of the present invention, a system is disclosed comprising a first processor, a computer readable medium electronically coupled to said first processor, and a plurality of instructions wherein at least a portion of said plurality of instructions are storable in said computer readable medium. The plurality of instructions are configured to cause said first processor to perform the steps of the above described methods.

According to another embodiment of the present invention a content management system having one or more shared file systems located on one or more networks having a firewall is disclosed. The content management system comprises an explorer client, a mounting client and a gateway. The explorer client forms a profile of a user device by determining the characteristics of the user device. The mounting client determines the capabilities of the one or more file systems and where content resides on each of the one or more file systems. The gateway creates a virtual abstraction layer. The gateway is in communication with both the explorer client and the mounting client. The gateway utilizes the profile of the user device and the capabilities of the one or more file systems when creating the virtual abstraction layer.

According to another embodiment of the present invention a content management system for devices having an intermittent mobile connection across a firewall is disclosed. The content management system comprises an explorer client, a mounting client, and a gateway. The explorer client forms a profile of a user device by determining the characteristics of the user device. The mounting client determines the capabilities of one or more file systems and a layout of content on the one or more file systems. The gateway generates and maintains a cached representation of the content of the one or more file systems. The cached representation is generated from the layout of content on the one or more file systems communicated to the gateway by the mounting client.

According to another embodiment of the present invention a method for managing content across a shared file system located on a network having a firewall is disclosed. The method comprises determining the characteristics of a user device when a user of the user device requests content from the file system. The characteristics of the user device include the type of device, the amount of RAM and disk space available on the user device, and the operating system utilized by the user device. The method further comprising determining the network characteristics including the current speed, capacity, and type of the network, as well as any firewall properties or restrictions that might affect transmission. The method further comprising determining the characteristics of the file system. The method further comprising creating a virtual abstraction layer based on the characteristics of the user device, the network, and the file system. The virtual abstraction layer provides the content from the shared file system to the user device such that the view to the user is the same as if that content was local to the user device.

The above summary of the present invention is not intended to represent each embodiment, or every aspect, of the present invention. Additional features and benefits of the present invention are apparent from the detailed description, figures, and claims set forth below.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Figure 1:
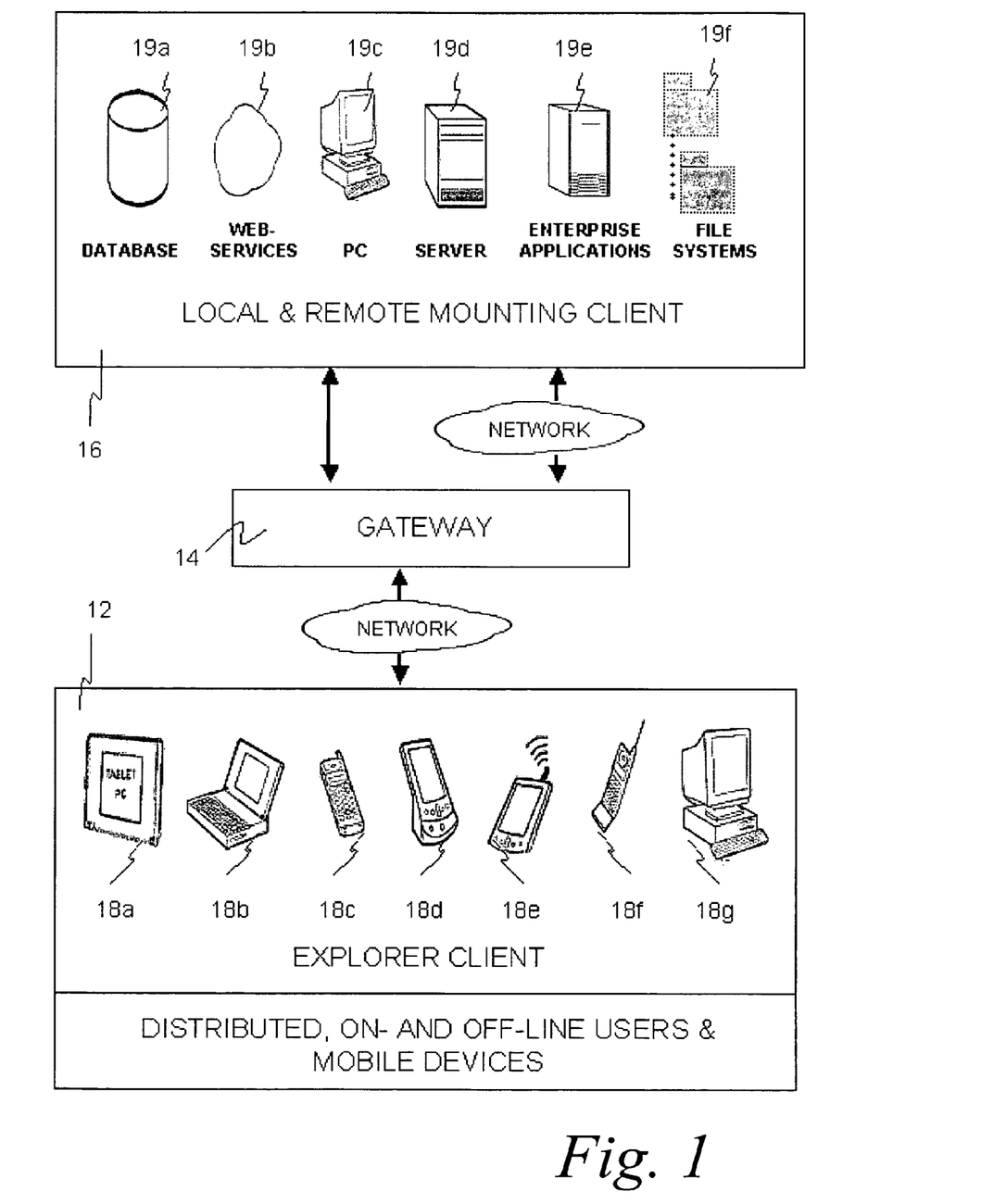
FIG. 1 is an illustration of a content management system, according to one embodiment of the present invention.

Turning now to the drawings, FIG. 1 illustrates a system for facilitating content management across shared, mobile file systems, according to one embodiment. The content management system 10 comprises a Shared File Systems Explorer Client ("Explorer Client") 12, a Shared Mobile File Systems Gateway ("Gateway") 14, and a Mobile File System Mounting Client ("Mounting Client") 16. The Explorer Client 12 and the Mounting Client 16 are adapted to function on a plurality of user devices 18a-e. As illustrated, the Explorer Client 12 may be provided on a tablet PC 18a, a laptop computer 18b, a cellular telephone 18c, a cradled personal digital assistant (PDA) 18d, a wireless PDA 18e, a smart phone 18f, or a desktop computer 18g. The Mounting Client 16 may be provided to additional devices, such as, for example, a database 19a, web services 19b, a desktop computer 19c, a server 19d, enterprise applications 19e, or file systems 19f. The Gateway 14 may be provided on a mainframe (operating on a UNIX platform), a PC server, or a similar device.

The Explorer Client 12 provides an interface from a wide variety of devices 18a-e (using the native file explorer interface of the device) for accessing and managing content across distributed, intermittently connected file systems 19f. The Gateway 14 allows users to create a centrally managed, fully distributed peer-to-peer file sharing and distribution network. Operators make a file system's 19f content available for sharing by registering it using the Mounting Client 16. The Explorer Client 12 then allows users to securely and efficiently move and copy objects between registered file systems. In addition, a number of advanced content management capabilities are provided by the Gateway 14 including an ability to inform a user when a piece of content has changed or become available. At the same time, administrators may track and report content usage including the specific association of content with users. Both the Mounting Client 16 and the Explorer Client 12 can communicate through firewalls to the Gateway 14.

A common problem with other content management systems is that they do not address the "intermittently disconnected" nature of mobile access, nor do they take into account the performance capabilities of the devices or networks being used. They assume the connection is "always on" and they do not recognize that a laptop connecting over a slow dial up line, will have different characteristics from a workstation on the corporate LAN, or a cell phone over an unstable wireless connection. Unlike prior systems, the content management system of the present invention creates a virtual abstraction layer that allows the Gateway 14—with the assistance of the Explorer Client 12 and the Mounting Client 16—to actively manage connections and performance in a seamless fashion without requiring user interaction.

On less traditional devices (PDAs, cellphones, etc.), the content management system of the present invention uses various filters, adapters, and caching mechanisms to improve performance and reliability based on the devices and networks involved in an operation.

The Explorer Client 12 is a native application that runs on a mobile device 18. The Explorer Client 12 contains components written in several different programming languages including C, C++, C#, .NET and Java. The Explorer Client 12 is adapted to run on a variety of different devices including devices running the Microsoft Windows Mobile OS (formerly Pocket PC or PPC), the Symbian OS, the Windows 2000 OS (Win2K, Windows Millenium), the Windows XP OS, the Windows XP tablet OS, the RIM OS, and the Palm OS.

According to one embodiment, the Explorer Client 12 runs in the native file system of the mobile device 18. Thus, a user is able to utilize the Explorer Client 12 without any additional training. Further, the Explorer Client 12 supports the full capabilities of the native file system on the mobile device 18. This provides a "highest common denominator approach" to content management.

According to another embodiment, implementation of the Explorer Client 12 provides a "thin client" that runs in a browser. This provides "lowest common denominator" coverage especially for those devices whose file system capabilities are limited (e.g., RIM). It also enables users to access content when they are not requesting the content from their own mobile device 18.

Figure 2:
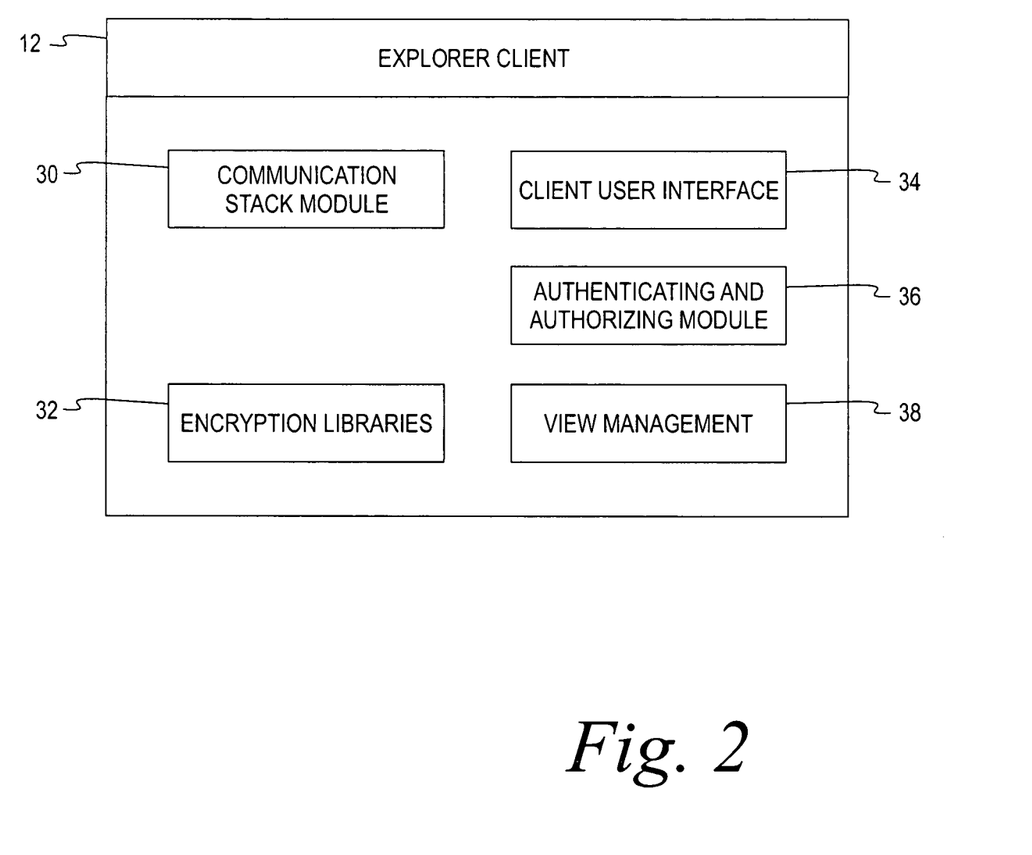
FIG. 2 is an architectural view showing components within a shared file system Explorer Client, according to one embodiment of the present invention.

Referring now to FIG. 2, an architectural view of the Explorer Client 12 is shown, according to one embodiment of the present invention. The Explorer Client 12 includes a communication stack module 30, which allows for communication between the Explorer Client 12 and the Gateway 14. According to one embodiment, the communication stack module 30 allows the Explorer Client 12 to communicate with the Gateway 14 in the Hypertext Transfer Protocol over Secure Socket Layer (HTTP over SSL) protocol. SSL is an open, nonproprietary protocol that uses a 40-bit key size for the RC4 stream encryption algorithm, which is considered an adequate degree of encryption for commercial exchange. Further, HTTP over SSL supports the use of X.509 digital certificates from the server so that, if necessary, a user can authenticate the sender.

The Explorer Client 12 also includes encryption libraries 32 which are native device libraries that support encryption. According to one embodiment, the mechanism for encrypting is SSL and the libraries are native SSL libraries. The Explorer Client 12 further includes a Client User Interface (CUI 34) 34. The CUI 34 provides a mechanism for presenting to the user a view of one or more file systems 19f and for manipulating the contents of those files systems 19f. According to one embodiment, the mechanism for implementing the CUI 34 is to utilize an existing native file explorer application, on the mobile device 18, that has been suitably extended. It is generally known within the industry that the native file explorers support such extensions.

The Explorer Client 12 also contains a module 36 for authenticating and authorizing a user. This module 36 enables a user to be authenticated and authorized against the Gateway 14, and includes communication and user interface components.

Finally, the Explorer Client 12 contains a mechanism for view management 38 that allows the Explorer Client 12 to present a view of the content available to the user (based on their permissions and other restrictions enforced by the Gateway 14) across one or more of the remote file systems. According to one embodiment, the implementation of this mechanism maintains a folder hierarchy view of virtual directories (network folders).

Figure 3:
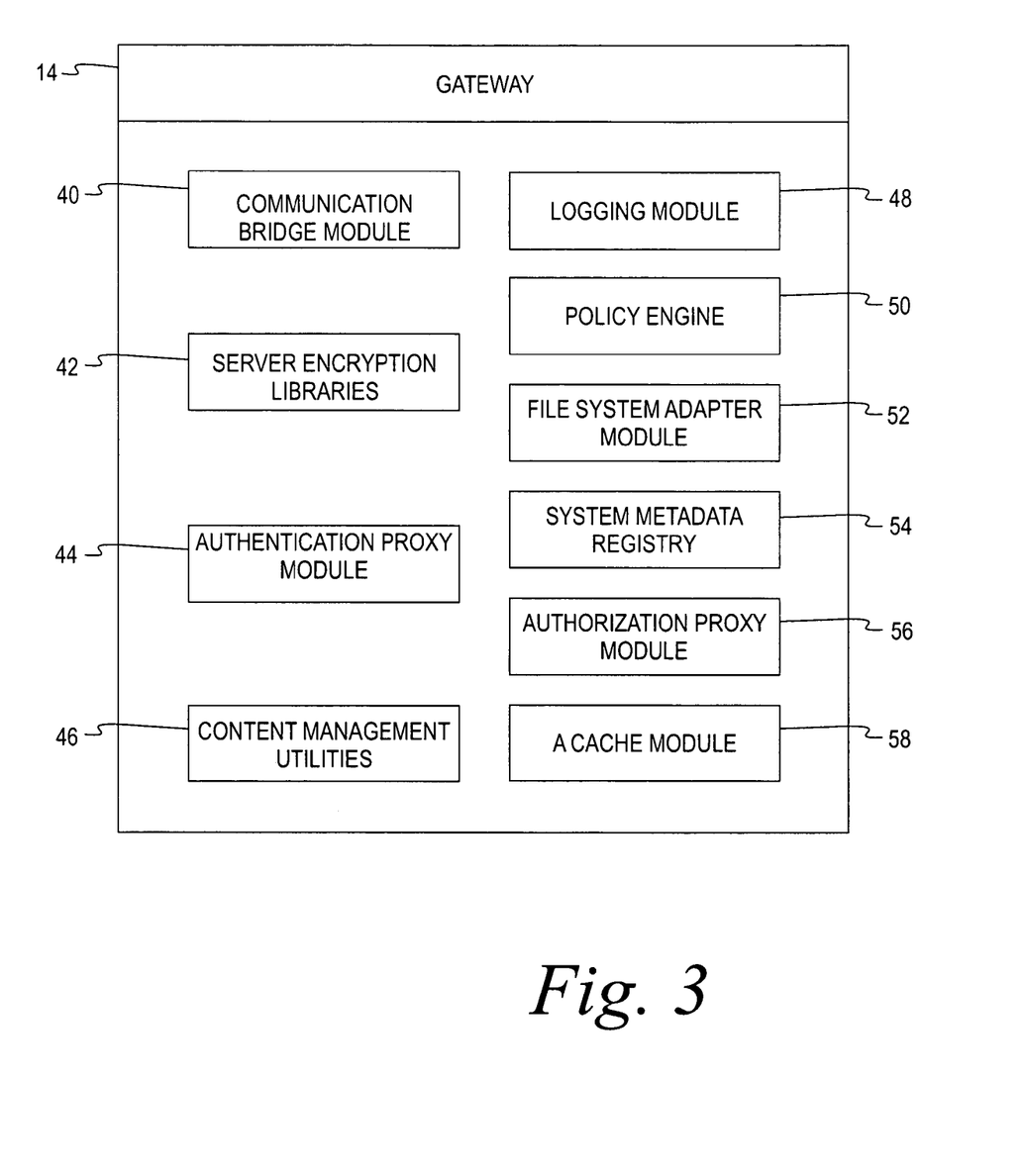
FIG. 3 is an architectural view showing components within a shared mobile file systems gateway, according to one embodiment of the present invention.

Referring now to FIG. 3, an architectural view of the Gateway 14 is shown, according to one embodiment of the present invention. The Gateway 14 provides a centralized network access point between the Explorer Client 12 and the remote, distributed, intermittently connected file systems 19f. The Gateway 14 preserves the native security of the remote file systems 19f while enabling additional layers of security and administration specific to the content management system 10 of which the Gateway 14 is a part.

The Gateway 14 is a, primarily java, application that runs within an existing web application server. The Gateway 14 can run on a number of different application servers including BEA Weblogic, and IBM Websphere and on a number of different operating systems including, but not limited to, Windows NT, Windows Server, Solaris, Linux, and HPUx.

Existing content management systems leverage existing internet/wireless infrastructure like content management applications and document repositories, but do not adequately address authenticating and authorizing a user. Further, these systems do not enable sufficient capabilities of the existing infrastructure. In current HTTP over SSL solutions, a "web application" is created separate from the remote file system with its own security and functionality that is defined and maintained separately from the remote file system. Usually, the content from remote file systems must be copied or replicated into a central document repository or content management system. Standard browsers provide a read-only capability to content on the server. Additionally, web application security relates to HTTP "actions" or "verbs." Thus, there is not a one-to-one mapping between these verbs and the actions related to manipulating the contents of a file system. In the content management system 10 of the present invention, the native security and other capabilities of the remote file system are propagated to the local devices of users through the Gateway 14.

The Gateway 14 contains a communication bridge module 40 which is a mechanism for communicating between the Gateway 14 and a plurality of Explorer and Mounting Clients 12,16. The preferred mechanism for communicating is HTTP over SSL. The mechanism incorporates proprietary extensions that support automatic disconnect recovery and queuing. These extensions include support for compression, file level recovery and differencing, and byte level recovery and differencing (e.g., the ability to recover quickly when HTTP communications are interrupted as frequently occurs over wireless networks). It also includes the ability to match the correct content to the correct context. For example, some content is not viewable on certain devices, or it needs to be provided in a different format (e.g., a cell phone might just receive an SMS notification, while a RIM device would be emailed a link to the document, but a PocketPC device would have the file pushed down on to the native file system).

The Gateway 14 includes server encryption libraries 42 that are native server libraries supporting encryption. According to one embodiment, the mechanism for encrypting is SSL, and the libraries are native SSL libraries. The Gateway 14 also includes an authentication proxy module 44 for authenticating users using user credentials provided directly via the CUI 34 (FIG. 2) or indirectly via cached information against an existing authentication server. According to one embodiment, the authentication proxy module 44 is as a server proxy that passes the authentication request through to the external authentication mechanism. The external authentication can include, but is not limited to, RADIUS, Active Directory, any LDAP compliant directory, or a FAT file system.

The Gateway 14 is able to provide security across multiple network domains. It can secure content and authorize users wherever the content or users are regardless of whether they are inside or outside a corporate firewall. For example, in a Management Service Provider (MSP) or an Application Service Provider (ASP) environment, the Gateway 14 can flexibly control security and access between and across different corporate domains each with a different authentication and authorization models. The Gateway 14 includes support for Kerberos, VPNs, etc.

The Gateway 14 is provided with content management utilities 46 that enable the extension of the functionality of the mounted or mapped file systems. For example, the content management utilities 46 can be used to enable automatic notification of file system changes and to enable automatic provisioning of content into one or more target file systems. A logging module 48 is included with the Gateway 14 for recording all system and user transactions to support non-repudiation and system recovery. The Gateway 14 also includes a policy engine 50 that allows all aspects of content management in the Gateway 14 to be specified as configurable business rules without any coding required, as discussed in assignee's companion patent application entitled Distributed Scalable Policy Based Content Management, which is incorporated herein by reference in its entirety. In effect, the virtual abstraction layer, as well as the rule for routing, distributing and controlling content in the virtual abstraction layer are defined as policies.

In standard devices and computers, almost all unstructured user content is stored within an enterprise file system. The most popular file systems for this purpose are Microsoft Windows based file systems. There are several different Windows file systems currently in use but the most popular is NT file system (NTFS). File systems provide a mechanism for storing and retrieving content. Without exception, file systems assume that a hierarchy (in the form of a simple tree structure) is used to organize the stored content. The hierarchy includes a containment structure called folders and individual items called files. To store the content in a retrievable manner, a file's name, location, and size must be stored somewhere. In addition to this basic material, most file systems also store permissions to control access to individual files and folders. The information that is associated with a file system is commonly referred to as the file system metadata.

In most file systems (UNIX, Apple, Microsoft Windows), information such as a file's location and name are stored in a distributed manner, with each directory storing a list of all the items that the system contains. The combination of the file's name and location forms the file's identifier (there are some exceptions in which a unique identifier is used instead—a relational database construct).

Permissions are usually stored on file systems that are intended for use with networked file systems. Since file date storage is so common, there is almost always a logical home for permissions to be stored alongside file dates in the dedicated metadata structures of the file system. File ownership is usually combined with permissions. Unix, for example, regulates file access by assigning rights to the file's owner, the file's group, and everyone else. In such an implementation, the permissions metadata is useless without the owner and group metadata. Again, this is usually all stored in a single metadata structure alongside the creation date, permission, and other "non-essential" metadata. However, there are some exceptions. For example, in new releases of windows server (212 and 213) the users and groups are often stored in Active Directory, while the NFTS permissions are stored elsewhere. Active Directory is a centralized and standardized system that automates network management of user data, security, and distributed resources, and enables interoperation with other directories. Active Directory is designed especially for distributed networking environments. In the future, the NTFS permissions may be stored in Active Directory as well. In windows it is also possible to have groups and users that are local to a specific machine (e.g., a laptop, etc.) that are not stored in Active Directory but these groups and users are typically not used with newer deployments of windows networked file systems.

The underlying definition and description of the file system exists in hidden files called metadata files. In Windows the majority of these files were implemented at the conception of NTFS, and almost all have existed since NT 3.5. These files are used strictly to manage data and expose a significant amount of information previously hidden in FAT file system implementations. The NTFS metadata files (with a few exceptions) can be mapped to metadata files in UNIX and MAC file systems. One of the key features of NTFS is the ability to define access control information for each system object—NTFS security. By applying different security policies, a user may allow or deny access to files and folders for particular users or groups.

The Gateway 14 includes a file system adapter 52 that facilitates the mounting (UNIX terminology) or mapping (Windows terminology) of one or more existing file systems to the Gateway 14. The adapter 52 enables a system administrator or user to make a file system 19*f* available. In doing so, users with the appropriate authorization can remotely manipulate the file system 19*f*. The authorization controls associated with the mounted file system are maintained by the Gateway 14. The adapter 52 supports a variety of common file system formats, including, but not limited to, NTFS, FAT, HTFS+, Solaris, Linux, Symbian, and PPC.

The file system adapters 52 used in the Gateway 14 automatically extract the file system metadata that is required to "mount" or "map" the file system 19*f* and subsequently allow users to manipulate the contents. The adapters 52 have been written so that they utilize existing file system application program interfaces to access the relevant metadata. All the vendors of existing file systems have made this information freely available and it is well documented in a variety of different formats.

The file system adapter module 52 extracts the information and then parses it into an internal virtual format. Some of the information is parsed into an Extensible Markup Language (XML) representation to enable rapid sharing with other system components and to minimize ongoing development and maintenance costs. The file system adapter module 52 stores the required metadata within the resource registry. Adding the information required to support the advanced content management capabilities further extends the metadata.

Some of the metadata extracted from the file system 19*f* is relevant to managing authorization and authentication. The Gateway 14 also uses other information such a file type, and file size. For example, it can compare the file type with the capabilities of the target mobile device to determine whether or not a file can be moved to the mobile device from another file system 19*f*.

A system metadata registry 54 is included in the Gateway 14. The metadata registry is a fully distributed registry that contains metadata about all resources managed by the Gateway 14. These resources include system policies, end-users, devices, networks, and file systems. According the one embodiment, the implementation of the system metadata registry 54 utilizes a LDAP registry or a windows system registry to store the metadata.

An authorization proxy module 56 is included in the Gateway 14 for authorizing users using user credentials provided directly via the CUI 34 (FIG. 2) or indirectly via cached information against either an existing authorization structure such as a NTFS file server or against a cached representation of an existing authorization structure.

Existing file systems 19*f* already include mechanisms for authorizing users. As discussed previously, the information required for authorizing the users is stored in the file system meta-data or in a network accessible directory or registry. The Gateway 14 uses the existing authorization information to authorize remote access to file systems 19*f*. As a result, a system administrator does not have to worry about maintaining remote authorization controls that are distinct from the file system authorization controls that are already in place.

The Gateway 14 supports the use of existing authorization information in several different ways. According to one embodiment, the Gateway 14 is configured to "pass" authorization requests back to the file system driver that controls authorization to the file system 19*f*. In this embodiment, the Gateway 14 acts as an authorization proxy between the remote Explorer Client 12 and the target file system 19*f*.

According to another embodiment, the Gateway 14 is configured to obtain a copy of the file system authorization meta-data from the file system 19*f* and to cache a representation of this copy locally. Doing so prevents the Gateway 14 from having to pass authorization requests back to the file server. This mechanism also supports the ability to build custom authorization filters that can be used on a user-by-user or device-by-device basis to tailor the handling of authorization requests.

According to another embodiment, the Gateway 14 is configured so that all authorization for remote access is handled by the Gateway 14 itself. In this embodiment the Gateway 14 over-rides the authorization component of the mapped file system(s) 19*f*.

Authentication works similarly to authorization. The Gateway 14 can be configured to support authentication in several different ways. According to one embodiment, the Gateway 14 is configured to "pass" authentication requests back to an external authentication authority such as an LDAP registry or RADIUS server. In this embodiment, the Gateway 14 acts as an authentication proxy between the remote Explorer Client 12 and the target authentication authority. Thus, all users and groups are maintained externally to the Gateway 14 in this embodiment. According to another embodiment, the Gateway 14 is configured so that all authentications are handled locally by the Gateway 14. In this embodiment, the Gateway 14 over-rides the authentication component of the mapped file system(s).

Additionally, a cache module 58 is included in the Gateway 14 for storing authentication and authorization information. This enables the rapid authentication and authorization of users with minimum consumption of network and system resources. Additionally, the cache module 58 may cache representations of file systems 19*f* enabling rapid access to file system's 19*f* contents even when the file system 19*f* resides on a device that is not operational or that is not connected to the network.

Figure 4:
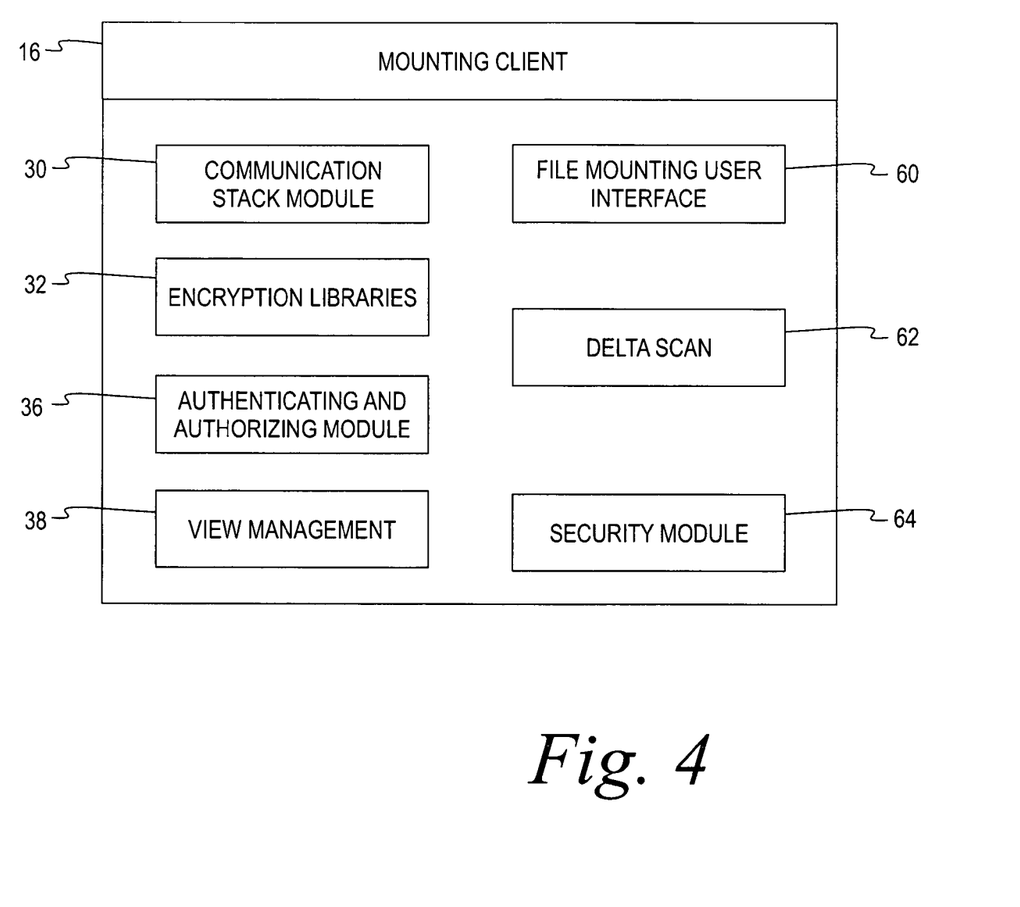
FIG. 4 is an architectural view showing components within a mobile file system Mounting Client, according to one embodiment of the present invention.

Referring now to FIG. 4, an architectural view of the Mounting Client 16 is shown, according to one embodiment of the present invention. The Mounting Client 16 provides an interface from a wide variety of devices 19 to publish or enable access to the local file system 19*f* via the Gateway 14. The Mounting Client 16 has the exact same components and modules as the Explorer Client 12, except that instead of a CUI 34 (FIG. 2) the Mounting Client 16 has a File Mounting User Interface (FMUI) 60 and includes additional components, such as delta scan 62 and security 64. Utilizing the FMUI 60, a user can navigate and select portions of their local file system 19*f*, and then navigate and indicate where in the Gateway 14 network folders the content should be made available on the Gateway 14. At this time, the Explorer Client 12 and Gateway 14 assimilate the containment structure and establish references to each of the folders and file objects therein. In this manner, the content on the newly mounted remote file system 19*f* is incorporated into the virtual abstraction layer maintained by the Gateway 14 and viewed through an Explorer Client 12.

As discussed above, the Mounting Client 16 includes both a delta scan component 62 and a security component 64. Once a representation of the local file system has been established, the delta scan component 62 identifies changes, additions, modifications and deletions to the containment structure and file objects and communicates these to the Gateway 14. The security component 64 also ensures that all authorizations associated with the portions of the local file system are propagated to the Gateway 14 for enforcement. This is done when the initial file mount is done, and it is updated on a continual basis as part of the delta scan. The delta scan 62 may be scheduled on a regular basis (every X number of minutes) and/or whenever a new connection between the file system 19*f* and the Gateway 14 is established (for intermittently connected file systems).

In addition to the file system mapping/mounting capability, the Mounting Client 16 allows users to "copy" or "move" digital content into file systems 19*f* that are local to the Gateway 14. This capability is useful in situations where the user does not care that the remotely accessible content is not tied to the original content in the file system 19*f*.

Figure 5:
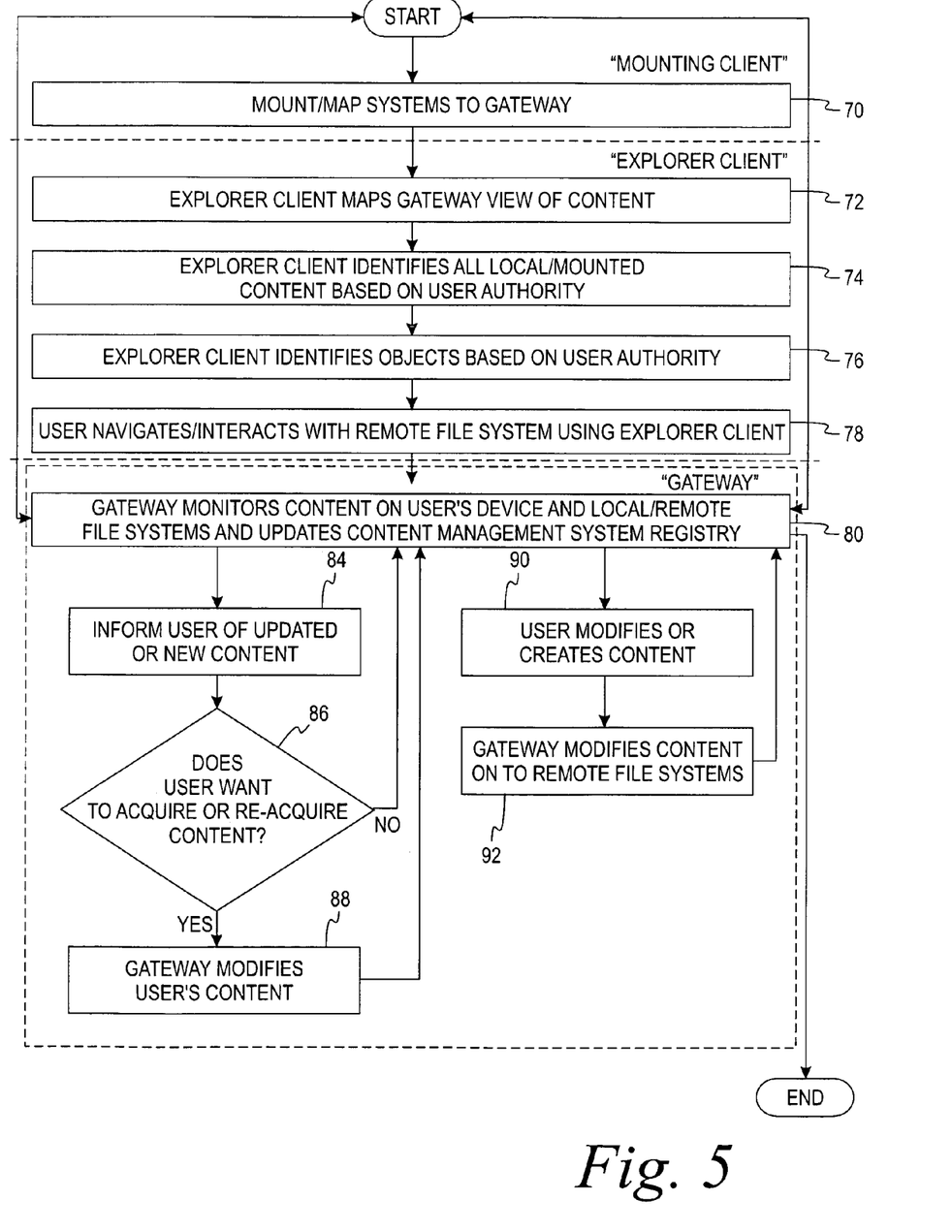
FIG. 5 is a flowchart illustrating the organization of content across a shared, mobile file system by the content management system, according to one embodiment of the present invention.

Referring now to FIG. 5, an example of the organization of content across a shared, mobile file system 19*f* by the content management system 10 will be described. Utilizing the Mounting Client 16, a user—with the appropriate system privileges—makes file systems 19*f* on one or more devices available by mounting or mapping them, at step 70, to the Gateway 14.

Another user can access content on those file systems 19*f* using the Explorer Client 12. The Explorer Client 12 presents a view of the remote file systems 19*f* made available through the Gateway 14. It does so by mapping the Gateway 14 view of the content on remote file systems 19*f* into the local file system of the device, at step 72. Once mapped, a user can use the native file explorer of the device to navigate and interact with the remote file system 19*f* through the Gateway 14. The Explorer Client 12 connects to the Gateway 14 which maintains the connections to the remote file systems 19*f* that were registered using the Mounting Client 16.

At step 74, the Explorer Client 12 automatically identifies all file systems 19*f* mounted on the Gateway 14 that a user has the authority to see and builds a representation of the file system(s) structure and content. This cached representation creates a virtual abstraction layer at the Gateway 14. The communication channel between the Explorer Client 12 and the Gateway 14 is encrypted—transparent to the user. The view of the remote content that is presented to a user is the same as if that content was already local to the device.

A user only sees objects within the remote file system(s) 19*f* that the user is authorized to access. All object permissions are similarly applied, at step 76. A user is authenticated against the remote systems using the same mechanisms that would be invoked if the user was logged into the remote file system 19*f* and accessing it directly.

Using the Explorer Client 12 a user can manipulate the content of a remote file system 19*f*, at step 78, in the same way that they manipulate the file system on a desktop computer running Microsoft Windows. For example, a user can acquire a piece of content such as a Microsoft Word document from the remote file system 19*f* by simply moving it to the local file system on their device 18. The Gateway 14 provides additional content management capabilities including determining whether or not the content that a user is attempting to acquire is suitable for the user's current device 18.

In addition to straight forward manipulation, the Gateway 14, through its policy engine 50, provides very sophisticated content management functionality across the shared, mobile, file systems 19*f* including, the ability to automatically pull or push content from one user's device 18 to another, intelligent notifications when content is available, automatic installation of applications (.exe files) on user devices 18, and document routing when content that has changed.

When a user "acquires" a piece of digital content, the Gateway 14 continues to monitor and manage the digital content, at step 80, both on the user's device 18 and on the remote file system 19*f*. If a user modifies the content (assuming they have permission to do so), at step 90, then the Gateway 14 will automatically update the modification on the remote file system 19*f*, at step 92, and that change will be pushed down to the local copies of the content on other users' devices 18. Once the remote file system 19*f* has been updated, the Gateway 14 continues to monitor the content, at step 80.

Additionally, if the acquired content changes so that a user's copy is no longer current, the user can be informed by the Gateway 14 so that the content can be "re-acquired," at step 84. A determination is made at decision box 86 as to whether a user wishes to re-acquire the content. If a user does not wish to re-acquire the content, the Gateway 14 continues to monitor the content, at step 80. However, if a user decides to re-acquire the content, the Gateway 14 modifies the content on the user's device 18, at step 88, and continues to monitor the content on the user's device 18, at step 80.

Figure 6:
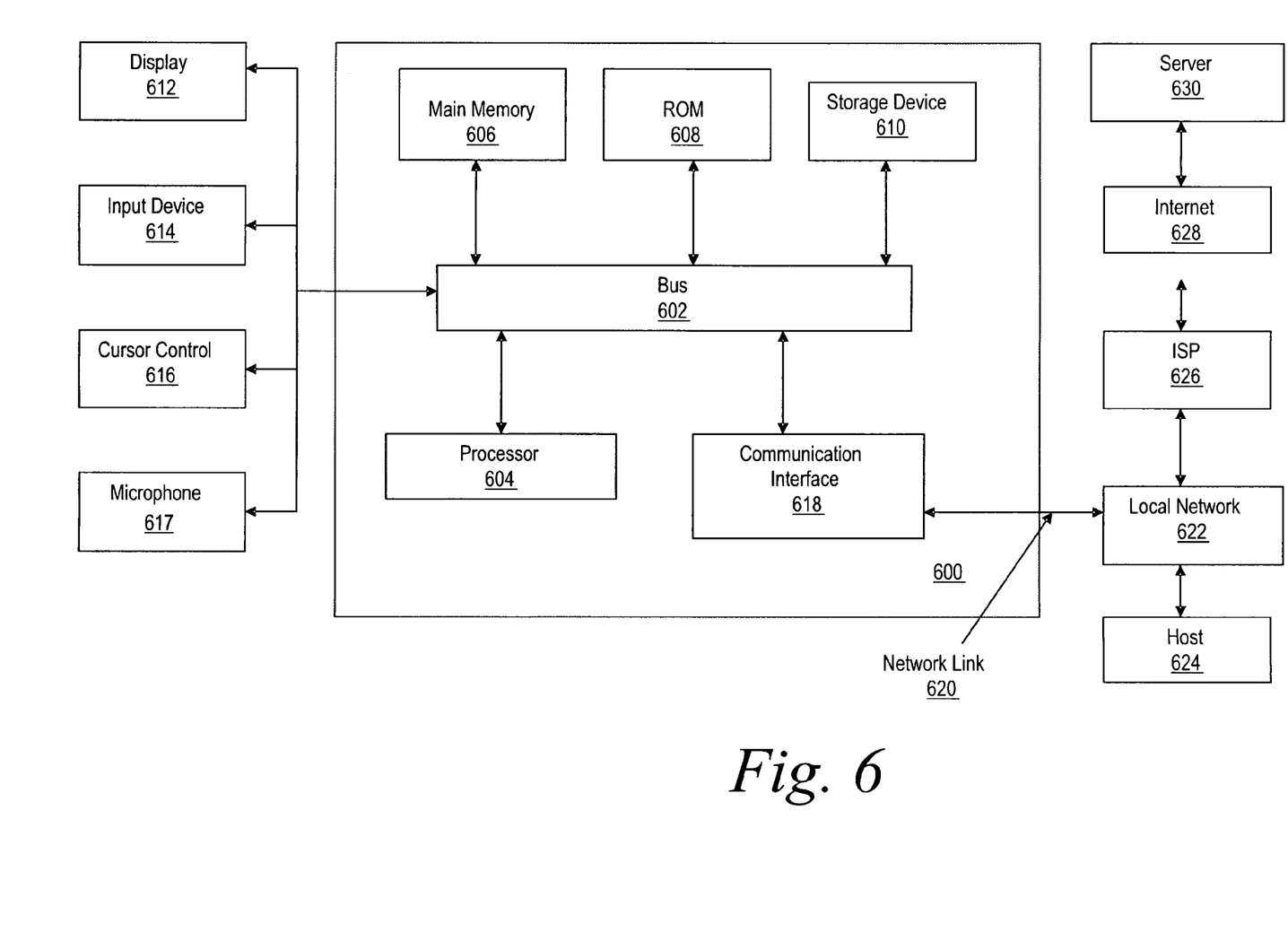
FIG. 6 is a block diagram that illustrates a computer system upon which embodiments of the invention may be implemented, according to one embodiment of the present invention.

FIG. 6 is a block diagram that illustrates a computer system 600 upon which embodiments of the invention may be implemented. Computer system 600 includes a bus 602 or other communication mechanism for communicating information, and a processor or processors 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as, for example, a magnetic disk or optical disk, is provided and coupled to bus 602 for storing information and instructions.

Computer system 600 may be coupled via bus 602 to a display 612, such as a cathode ray tube (CRT), liquid crystal display (LCD), or may be a handheld active or passive display, for displaying information to a computer user. An input device 614, including alphanumeric and other keys, is coupled to bus 602 for communicating information and command selections to processor 604. Other user input devices include cursor control 616 or microphone 617. Cursor control 616 may include one or more of any number of devices, such as, for example, a mouse, a trackball, or cursor direction keys for communicating direction information and command selections to processor 604 and for controlling cursor movement on display 612. The cursor control 616 typically has two degrees of freedom in two axes, a first axis (e.g., x) and a second axis (e.g., y), allowing the device to specify positions in a plane.

Execution of sequences of instructions contained in main memory 606 causes processor 604 to perform the process steps described above. One or more processors in a multi-processing arrangement may also be employed to execute the sequences of instructions contained in main memory 606. In alternative embodiments, hard-wired circuitry may be used in place of or in combination with software instructions and it is to be understood that no specific combination of hardware circuitry and software are required. Instructions may be provided in any number of forms such as source code, assembly code, object code, machine language, compressed or encrypted versions of the foregoing, and any and all equivalents thereof. "Computer-readable medium" refers to any medium that participates in providing instructions to processor 604 for execution and "program product" refers to such a computer-readable medium bearing a computer-executable program. The computer usable medium may be referred to as "bearing" the instructions, which encompass all ways in which instructions are associated with a computer usable medium. Computer-readable mediums include, but are not limited to, non-volatile media, volatile media, and transmission media. Non-volatile media include, for example, optical or magnetic disks, such as storage device 610. Volatile media include dynamic memory, such as main memory 606. Transmission media include coaxial cables, copper wire and fiber optics, including the wires that comprise bus 602. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be borne on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. Instructions received by main memory 606 may optionally be stored on storage device 610 either before or after execution by processor 604.

Computer system 600 may also include a communication interface 618 coupled to bus 602 to provide a two-way data communication coupling to a network link 620 connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network, now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information. Thus the processing required by method of the invention described by way of example herein may be implemented on a local computer utilizing storage device 610 or may be implemented, for example, on a LAN or over the Internet.

Computer system 600 can send messages and receive data, including program code, through the network(s), network link 620, and communication interface 618. In the Internet example, a server 630 might transmit a requested code for an application program through Internet 628, ISP 626, local network 622 and communication interface 618. In accord with the invention, one such downloaded application provides for transmitting an inspection procedure to an inspector at a remote inspection data from a central computer and receiving, in the central computer, information transmitted from the inspector at a remote location to permit processing of the inspection information by the central computer. The received code may be executed by processor 604 as it is received, and/or stored in storage device 610, or other nonvolatile storage for later execution. In this manner, computer system 600 may obtain application code in the form of a carrier wave.

As should be clear from the above discussion, by creating a virtual abstraction layer, the content management system 10 of the present invention addresses the "intermittently disconnected nature" of mobile access and takes into account the performance and functional capabilities of the devices or networks being used. This makes it possible for organizations to enable secure access, and management of files for users regardless of the location of the users or files, or the capabilities of the devices and networks involved.

The content management system 10 of the present invention includes the Gateway 14 that mediates access from users who have the Explorer Client 12 to file systems 19*f* made available through the use of the Mounting Client 16. The file systems and users can be associated with any type of mobile (or non-mobile) computing device 18, and they can be located anywhere inside or outside the corporate firewall.

The content management system 10 of the present invention provides for the secure, reliable, and seamless access to files on remote, mobile file systems 19*f*. In so doing, the content management system 10 copes with the intermittent nature of mobile connections, the different capabilities of different remote file systems 19*f*, and the security of the files being accessed in such a manner that the complexities are hidden from the user. The accessing of files includes the ability to: (1) add, move, and change file system authorizations remotely; (2) remotely manipulate the contents of the file system 19*f* using all the existing file system actions such as the ability to create new files, modify existing files, delete files, and read files; (3) remotely manipulate the structure of the file system 19*f* using all the existing file system actions such as the ability to create new folders, modify existing folders, delete folders, and change the folder hierarchy.

The content management system 10 of the present invention provides for the transparent authorization of users based on existing file system authorization structures in the remote file systems 19*f* by one or more of the following: (1) authorizing users directly against the remote file system structure using "pass through" authorization; (2) authorizing users indirectly against a cached representation of the remote file system structure residing within the Gateway 14; and (3) authorizing users indirectly against a virtual authorization structure maintained by the Gateway 14 that overrides remote file system authorization structure.

The content management system 10 of the present invention provides for transparently authenticating users by one or more of the following: (1) directly authenticating against an existing authentication system for the remote file system structure such as Active Directory, RADIUS, and LDAP using "pass through" authentication; (2) indirectly authenticating against a cached representation of an existing authentication system for the remote file system 19*f* that resides within the Gateway 14; (3) indirectly authenticating against a virtual authentication system maintained by the Gateway 14 that overrides any existing authorization structure.

The content management system 10 of the present invention provides distributed content authorization by maintaining the authorizations associated with content when they are copied or otherwise moved via the Gateway 14 to a user's local file system on their mobile device 18. According to one embodiment, the implementation of the content management system 10 propagates or inherits—from the remote file system—permissions (such as NTFS) into the Gateway 14 as Lightweight Directory Access Protocol (LDAP) entries in one of two ways: (1) real time authorization; or (2) near real time synchronization. In both solutions, security permissions are successfully inherited and enforce proper access permissions to content (e.g., files and folders) discovered and acquired by Explorer Client 12 users.

The real time authorization utilizes an LDAP NTFS authorization plugin. This plugin is used in conjunction with the LDAP Access Control Instruction (ACI) plugin to enforce access control of a warehouse associated to a shared mount point. The plugin uses the Discretionary Access Control List (DACL) of files and folders when the LDAP ACI plugin is invoked against a given LDAP entry.

The near real time synchronization of NTFS DACL to LDAP ACIs utilizes a daemon process. Running as an authorized NTFS domain user for the given mount point and as an authorized Gateway 14 system user, the process detects near real-time changes that occur on the DACLs of files and folders. The security changes are then reflected on the Gateway 14 metadata specified as LDAP ACIs. The security updates are transmitted over HTTPs when the permissions change on the associated mount point.

The content management system 10 of the present invention provides the generation and maintenance of cached representations of file system authorizations and authentication information. The cached representations can be re-generated/generated manually or automatically in response to changes. This results in decreased user perceived latency, as well as decreased consumption of network bandwidth.

The content management system 10 of the present invention provides the generation and maintenance of cached representations of the contents of file systems 19*f*. Users of the Explorer Client 12 can transparently interact with the cached representation of a file system instead of directly with the file system 19f. The cached representations can be re-generated/generated manually or automatically in response to changes. This results in increased availability of content, decreased user perceived latency, and decreased consumption of network bandwidth.

The content management system 10 of the present invention provides the ability to overlay additional content management functionality in addition to that provided by remote mobile file systems 19f. The functionality includes, but is not limited to, the ability to: inform the user of changes in managed file systems 19f; queue content for delivery to a mobile device; track which users have what content on what file systems (and push and pull content from those users automatically); specify that certain users or groups of users must have specific content on a particular file system 19f; indicate where on the system the content should be; or automatically install the content (in the case where the content are actual applications to be deployed). All of this is done without requiring any actions by the end-users.

While the present invention has been described with reference to one or more particular embodiments, those skilled in the art will recognize that many changes may be made thereto without departing from the spirit and scope of the present invention. Each of these embodiments and obvious variations thereof is contemplated as falling within the scope of the claimed invention, which is set forth in the following claims.

What is claimed is:

1. A method for sharing content stored across a plurality of shared file systems and a plurality of mobile devices located on a plurality of networks comprising at least one wireless network providing intermittent connectivity, said mobile devices and networks having variable performance and functional characteristics, the method comprising:
   continuously determining the performance and functional characteristics of a said mobile devices and of said networks every time a user of one of said mobile devices performs one or more actions related to said content stored across a plurality of the shared file systems, the functional characteristics of the mobile device including the type of device and the operating system utilized by the mobile device, and the performance characteristics of the mobile device including the amount of current unused memory available on the mobile device, the performance characteristics of said wireless network providing intermittent connectivity including the current speed and capacity, and the functional characteristics of said networks includes the type of networks;
   determining the characteristics of the file systems that contain the content; and
   creating and continuously maintaining a virtual abstraction layer based on the performance and functional characteristics of the mobile devices, the networks, and the shared file systems, the virtual abstraction layer providing a view to a said plurality of mobile devices as if said content is local to said plurality of mobile devices and the virtual abstraction layer providing the content from at least one of the plurality of the shared file systems to at least one of the mobile devices allowing the mobile device to access the functions of the file system containing the requested content including manipulating the content as if the file system was local to the mobile device.

2. The method of claim 1 further comprising capturing an authorization structure in the shared file system on which the content resides, the authorization structure offered by the shared file system providing the content to the mobile device to allow the user of the mobile device to manipulate the content.

3. The method of claim 2 further comprising transparently authorizing the user directly against an authorization structure of one of more of said shared file systems using pass through authorization.

4. The method of claim 2 further comprising transparently authorizing the user indirectly against a cached representation of an authorization structure of one of more of said shared file systems.

5. The method of claim 2 further comprising transparently authorizing the user indirectly against a virtual authorization structure that overrides an authorization structure of one of more of said shared file systems.

6. The method of claim 2, wherein the captured authorization structure is maintained with the content when the content is provided to the mobile device.

7. The method of claim 2 further comprising providing the ability to add, move, and change said authorization structure from the mobile device.

8. The method of claim 1, wherein said manipulating the content include one or more of an ability to create new files, an ability to modify existing files, an ability to delete files, and an ability to read files.

9. The method of claim 8, wherein said manipulating the content further include one or more of moving files, an duplicating files, accessing files, sending and forwarding files, and routing files to other mobile devices.

10. The method of claim 8 further comprising organizing the content including one or more of creating new folders, modifying existing folders, deleting folders, modifying the folder hierarchy, duplicate folders, an ability to support nested folders, and an ability to move folders.

11. The method of claim 1 further comprising providing the ability, via the virtual abstraction layer, to inform the user of the mobile device of changes in the file systems on said plurality of networks.

12. The method of claim 1 further comprising providing the ability, via the virtual abstraction layer, to queue said content for delivery to the mobile device.

13. The method of claim 1 further comprising providing the ability, via the virtual abstraction layer, to synchronize content stored between mobile devices and said shared file systems.

14. The method of claim 1 further comprising providing the ability, via the virtual abstraction layer, to specify that a user has several mobile devices and that said view can be different depending on the performance and functional characteristics of each mobile device.

15. A method for managing content across an intermittent mobile connection using a plurality of networks comprising at least one wireless network providing intermittent connectivity, the method comprising:
   managing a plurality of file systems located on said plurality of networks;
   continuously determining the performance and functional characteristics of a mobile device and said intermittent mobile connection, each time a user of the mobile device performs one or more actions related to content from any of the said file systems across the intermittent mobile connection, the functional characteristics of the mobile device including the type of device and the operating system utilized, and the performance characteristics of said mobile device including the amount of current unused memory available and the performance characteristics of said intermittent mobile connection including the current speed, capacity, and the functional characteristics of said intermittent connection including the type of the connection;

determining the characteristics of the managed file systems that contain the content, including the characteristics of the content on the file system;

generating and continuously maintaining a local virtual abstraction layer for each mobile device as a cached representation of the content of the managed file systems on the mobile device;

allowing the mobile device access to the functions of the managed file systems to manipulate said cached representation of the content as if the managed file systems were local to the mobile device; and sending the manipulated content across the intermittent mobile connection to the managed file systems of the content from the mobile device.

16. The method of claim 15, wherein the cached representation is generated manually in response to a change detected on any of the managed file systems.

17. The method of claim 15, wherein the cached representation is generated automatically in response to a change detected on any of the managed file systems.

18. A method for managing content across an intermittent mobile connection using a plurality of networks comprising at least one wireless network providing intermittent connectivity, the method comprising:

managing one or more file systems;

continuously determining the performance and functional characteristics of a mobile device and of the intermittent mobile connection each time a user of the mobile device performs one or more actions related to content from any of the managed file systems, the functional characteristics of the mobile device including the type of device and the operating system utilized by the mobile device, and the performance characteristics including the amount of current unused memory available on the mobile device, the performance and functional characteristics of the intermittent mobile connection, the performance characteristics including the current speed and capacity, and the functional characteristics includes the type of the connection;

determining the characteristics of any of the managed file systems that contain the content, the characteristics of the file system including an authorization structure and authentication information provided by any of the managed file systems providing the content; and generating and continuously maintaining a local virtual abstraction layer for each mobile device as a cached representation on the mobile device of the authorization structure and authentication information from any of the managed file systems providing the content, the cached representation allowing the user of the mobile device to access the functions of any of the managed file systems providing the content as if the file system is local to the mobile device, the functions including authorizing, authenticating and permitting the user on the mobile device to modify the content.

19. The method of claim 18, wherein the cached representation is generated manually in response to a change detected on any of the managed file systems.

20. The method of claim 18, wherein the cached representation is generated automatically in response to a change detected on any of the managed file systems.

21. The method of claim 18, wherein the cached representation is capable of authorizing and authenticating the user on the mobile device transparently.

22. The method of claim 18, wherein said local virtual abstraction layer is based on the characteristics of the mobile device, the intermittent mobile connection, and the managed file systems, the local virtual abstraction layer providing the content from the managed file systems to the mobile device such that the view to the user is the same as if that content was local to the mobile device.

23. The method of claim 22 wherein said virtual abstraction layer generates and maintains a cached representation of the content of the managed file systems, the cached representation being capable of being transparently interacted with by the user on the mobile device.

24. The method of claim 23, wherein the cached representation of the authorization structure and authentication information is maintained along with the cached representation of the content of the managed file systems, such that the user is authorized and authenticated on the mobile device prior to being allowed to interact with the cached representation of the content.

25. A system for managing a plurality of content stored across a plurality of shared file systems located on a plurality of networks comprising at least one wireless network providing intermittent connectivity, the system comprising:

a first processor;

a computer readable medium electronically coupled to said first processor; and a plurality of instructions wherein at least a portion of said plurality of instructions are storable in said computer readable medium, and further wherein said plurality of instructions are configured to cause said first processor to perform:

a) continuously determining and maintaining the performance and functional characteristics of a mobile device and of said plurality of networks each time a user of the ~ mobile device performs one or more actions related to content from the plurality of content stored across a plurality of the shared file systems, the functional characteristics of the mobile device including the type of device and the operating system utilized by the mobile device, and the performance characteristics including the amount of current unused memory available on the mobile device, the performance characteristics of the plurality of networks comprising at least one wireless network providing intermittent connectivity including the current speed and capacity, and the functional characteristics of the plurality of networks including the type of networks;

b) determining the characteristics of the file systems that contain the content; and c) creating and continuously maintaining a virtual abstraction layer based on the characteristics of the mobile device, the networks, and the file systems, the virtual abstraction layer providing a view to a plurality of mobile devices as if content is local to the mobile devices and the virtual abstraction layer providing the content from at least one of the plurality of the shared file systems to at least one of the mobile devices allowing the mobile device to access the functions of the file system containing the content including manipulating the content as if the file system is local to the mobile device.

26. A system for managing content across an intermittent mobile connection using a plurality of networks comprising at least one wireless network providing intermittent connectivity, the system comprising:

a first processor;

a computer readable medium electronically coupled to said first processor; and a plurality of instructions wherein at least a portion of said plurality of instructions are storable in said computer readable medium, and further wherein said plurality of instructions are configured to cause said first processor to perform:
  a) managing a plurality of file systems;
  b) continuously determining the performance and functional characteristics of a mobile device and the intermittent mobile connection each time a user of a mobile device performs one or more actions related to content from any of the managed file systems across the intermittent mobile connection, the functional characteristics of the mobile device including the type of device and the operating system utilized by the mobile device, and the performance characteristics including the amount of current unused memory available on the mobile device, the performance characteristics of the intermittent mobile connection including the current speed and capacity, and the functional characteristics of the intermittent mobile connection including the type of the connection;
  c) determining the characteristics of any of the managed file systems that contain the content, including the characteristics of the content on the file systems; and
  d) generating and continuously maintaining a local virtual abstraction layer for each mobile device as a cached representation of the content of the managed file systems on the mobile device, the cached representation of the content being manipulated by the user on the mobile device;
allowing the mobile device access to the functions of the file system containing the content as if the file system is local to the mobile device; and
sending the manipulated content across the intermittent mobile connection to the file systems of the managed content from the mobile device.

27. A system for managing content across an intermittent mobile connection using a plurality of networks comprising at least one wireless network providing intermittent connectivity, the system comprising:
  a first processor;
  a computer readable medium electronically coupled to said first processor; and
  a plurality of instructions wherein at least a portion of said plurality of instructions are storable in said computer readable medium, and further wherein said plurality of instructions are configured to cause said first processor to perform:
  a) managing one or more file systems;
  b) continuously determining the performance and functional characteristics of a mobile user device and said intermittent mobile connection each time a user of the mobile device performs one or more actions related to the content from any of the managed file systems, the functional characteristics of the mobile device including the type of mobile device, and the operating system utilized by the mobile device, and the performance characteristics including the amount of current unused memory available on the mobile device, the performance characteristics of the intermittent mobile connection including the current speed , and capacity, and the functional characteristics of the intermittent mobile connection includes the type of the connection;
  c) determining the characteristics of any of the managed file systems that contain the content, the characteristics of the file system including an authorization structure and authentication information provided by any of the managed file systems that contain the content; and
  d) generating and continuously maintaining a local virtual abstraction layer for each mobile device as a cached representation one on the mobile device of the authorization structure and authentication information from any of the managed file systems that contain the content, the cached representation allowing the user of the mobile device to access the functions of any of the managed file systems providing the content as if the file system is local to the mobile device, the functions including authorizing, authenticating and permitting the user on the mobile device to modify the requested content.

28. A method for managing a plurality of content stored across a shared file system located on a plurality of networks comprising at least one wireless network providing intermittent connectivity, the method comprising:
  continuously determining the performance and functional characteristics of a mobile device and of the plurality of networks each time a user of the mobile device performs one or more actions related to the content from the plurality of content stored across a plurality of the shared file systems, the functional characteristics of the mobile device including the type of device and the operating system utilized by the mobile device, and the performance characteristics including the amount of current unused memory available on the mobile device, the performance characteristics of the plurality of networks comprising at least one wireless network providing intermittent connectivity including the current speed and capacity, and the functional characteristics includes the type of network;
  determining the characteristics of the file system; and
  creating and continuously maintaining a virtual abstraction layer based on the characteristics of the device, the plurality of networks, and the file system, the virtual abstraction layer providing a view to a plurality of mobile devices as if that content was local to the respective mobile devices and the virtual abstraction layer providing the content from the shared file system to at least one of the mobile devices allowing the mobile device to access the functions of the file system containing the content including manipulating the content as if the file system was local to the mobile device.

29. The method of claim 28 further comprising capturing an authorization structure in the shared file system, the authorization structure offered by the shared file system providing the content to the mobile device to allow the user of the mobile device to manipulate the content.

30. The method of claim 29 further comprising transparently authorizing the user directly against the file system authorization structure using pass through authorization.

31. The method of claim 29 further comprising transparently authorizing the user indirectly against a cached representation of the file system authorization structure.

32. The method of claim 29 further comprising transparently authorizing the user indirectly against a virtual authorization structure that overrides the file system authorization structure.

33. The method of claim 29, wherein the captured authorization structure is maintained with the content when the content is provided to the mobile device.

34. The method of claim 29 further comprising providing the ability to add, move, and change the files system authorization structure from the mobile device.

35. The method of claim 29, wherein said manipulating includes one or more of an ability to create new files, an ability to modify existing files, an ability to delete files, and an ability to read files.

36. The method of claim 35, wherein said manipulating further include one or more of moving files, duplicating files, sending and forwarding files, and routing files to other mobile devices.

37. The method of claim 35, further comprising organizing said content which includes one or more of creating new folders, modifying existing folders, deleting folders, modifying the folder hierarchy, duplicating folders, supporting nested folders, and moving folders.

38. The method of claim 28 further comprising providing the ability, via the virtual abstraction layer, to specify that a user has several mobile devices and that said view can be different depending on the performance and functional characteristics of each mobile device.

* * * * *